(12) United States Patent  
Shimizu

(10) Patent No.: US 8,902,468 B2  
(45) Date of Patent: Dec. 2, 2014

(54) IMAGE CORRECTION DEVICE AND METHOD, AND IMAGE READING APPARATUS

(71) Applicant: Fujitsu Limited, Kawasaki-shi (JP)

(72) Inventor: Masayoshi Shimizu, Hadano (JP)

(73) Assignee: Fujitsu Limited, Kawasaki (JP)

( * ) Notice: Subject to any disclaimer, the term of this patent is extended or adjusted under 35 U.S.C. 154(b) by 55 days.

(21) Appl. No.: 13/741,487

(22) Filed: Jan. 15, 2013

(65) Prior Publication Data

US 2013/0258428 A1 Oct. 3, 2013

(30) Foreign Application Priority Data

Mar. 29, 2012 (JP) .................................. 2012-76800

(51) Int. Cl.
- *H04N 1/60* (2006.01)
- *H04N 1/46* (2006.01)
- *G03F 3/08* (2006.01)
- *G03G 15/00* (2006.01)

(52) U.S. Cl.
CPC ........... *H04N 1/6083* (2013.01); *H04N 1/6041* (2013.01)
USPC ............. 358/1.9; 358/509; 358/518; 399/362

(58) Field of Classification Search
None
See application file for complete search history.

(56) References Cited

U.S. PATENT DOCUMENTS

| 4,926,253 | A | * | 5/1990 | Nakashima et al. | ........... 358/515 |
| 5,760,925 | A | * | 6/1998 | Saund et al. | ................... 358/497 |
| 5,764,383 | A | * | 6/1998 | Saund et al. | ................... 358/497 |
| 5,969,829 | A | * | 10/1999 | Matsuda et al. | ............... 358/475 |
| 6,958,834 | B1 | * | 10/2005 | Ide | ................... 358/505 |
| 7,023,591 | B2 | | 4/2006 | Hokoi | |
| 7,031,550 | B2 | * | 4/2006 | Nakajima | ...................... 382/274 |
| 7,630,105 | B2 | * | 12/2009 | Sheng et al. | ................... 358/497 |
| 7,755,796 | B1 | * | 7/2010 | Phillips et al. | ................. 358/1.9 |
| 2002/0057469 | A1 | * | 5/2002 | Yushiya et al. | ................. 358/509 |
| 2002/0071141 | A1 | * | 6/2002 | Katakura et al. | ............... 358/474 |
| 2003/0035149 | A1 | * | 2/2003 | Ishikawa et al. | .............. 358/302 |
| 2003/0048490 | A1 | * | 3/2003 | Yanagihara et al. | .......... 358/474 |
| 2005/0094168 | A1 | * | 5/2005 | Cheng | ............................ 358/1.9 |
| 2005/0151993 | A1 | * | 7/2005 | Gartstein et al. | ............. 358/1.15 |
| 2005/0275911 | A1 | * | 12/2005 | Yamada et al. | ................ 358/518 |
| 2006/0268352 | A1 | * | 11/2006 | Tanigawa et al. | ............. 358/403 |

(Continued)

FOREIGN PATENT DOCUMENTS

| JP | 2002-171388 | A | 6/2002 |
| JP | 2003-101772 | A | 4/2003 |
| JP | 2004-150873 | A | 5/2004 |
| JP | 2008-199556 | A | 8/2008 |

*Primary Examiner* — Madelein A Nguyen
(74) *Attorney, Agent, or Firm* — Fujitsu Patent Center

(57) ABSTRACT

An image correction device includes a processor that executes a procedure. The procedure includes: correcting an image of a read object based on images stored in a storage section of a self-illuminated reference chart image of a reference chart of size corresponding to a mounting region where the read object is mounted that has been read in advance in a state illuminated by only a self-illumination light, a uniform light standard color chart image of a standard color chart that has been read in advance in a state illuminated by only uniform light from a predetermined uniform light source, and a uniform light reference chart image of the reference chart that has been read in advance in a state illuminated by only the uniform light, and based on the image of the read object and a peripheral light standard color chart image read by a reading section.

9 Claims, 12 Drawing Sheets

(56) References Cited

U.S. PATENT DOCUMENTS

| | | | |
|---|---|---|---|
| 2007/0030521 A1* | 2/2007 | Fujii et al. | 358/3.28 |
| 2007/0076275 A1* | 4/2007 | Mead | 358/509 |
| 2007/0188780 A1* | 8/2007 | Edge | 358/1.9 |
| 2007/0247681 A1* | 10/2007 | Klassen | 358/532 |
| 2007/0253600 A1* | 11/2007 | Furukawa et al. | 382/112 |
| 2008/0024652 A1* | 1/2008 | Aoki | 348/361 |
| 2008/0089580 A1* | 4/2008 | Marcu | 382/162 |
| 2008/0298677 A1* | 12/2008 | Hayase | 382/162 |
| 2009/0002783 A1* | 1/2009 | Hashii et al. | 358/520 |
| 2009/0274370 A1* | 11/2009 | Sakamoto et al. | 382/190 |
| 2010/0271505 A1* | 10/2010 | Zimmer et al. | 348/231.2 |
| 2010/0302562 A1* | 12/2010 | Bonnier et al. | 358/1.9 |
| 2011/0080626 A1* | 4/2011 | Morikawa | 358/509 |
| 2011/0096375 A1* | 4/2011 | Mikami | 358/475 |
| 2011/0317915 A1* | 12/2011 | Gil | 382/167 |
| 2013/0088729 A1* | 4/2013 | Fu et al. | 358/1.9 |
| 2013/0222871 A1* | 8/2013 | Wardega | 358/505 |

* cited by examiner

IMAGE CORRECTION DEVICE AND METHOD, AND IMAGE READING APPARATUS

CROSS-REFERENCE TO RELATED APPLICATION

This application is based upon and claims the benefit of priority of the prior Japanese Patent Application No. 2012-76800, filed on Mar. 29, 2012, the entire contents of which are incorporated herein by reference.

FIELD

The embodiments discussed herein are related to an image correction device and method, to a recording medium stored with an image correction program, and to an image reading apparatus.

BACKGROUND

A stand type of image scanner 80, such as illustrated in FIG. 10, is known as an image reading apparatus that illuminates an original with illumination light and reads light reflected from the original to read an original image. In the stand image scanner 80, illumination light (self-illumination light) 84 is illuminated onto an original from a lighting device provided to a head 82A of a stand 82, and light reflected from the original is read while a line sensor such as a line CCD provided to the head 82A of the stand 82 is being scanned. In an image reading apparatus in which illumination light is illuminated in this manner, sometimes image correction processing is required to correct color shift in an image caused by the self-illumination not illuminating the original uniformly.

As image correction processing, white balance correction is generally performed on an image captured by a digital camera. Such white balance correction corrects on the basis that the brightest portion in a captured image corresponds to a white portion in the subject, and the entire captured image is corrected by subtracting a fixed value in which the color shift in the brightest portion is taken as corresponding to a component of the color of the illumination light. Basically good correction can be achieved when such image correction processing is applied to an image read by the stand image scanner 80 as illustrated in FIG. 10 for cases in which the self-illumination illuminates the original substantial uniformly.

However correction with good precision cannot be achieved when self-illumination is non-uniform. This is because when correction is performed with a correction amount determined with reference to the brightest portion in an image, the correction amount is inappropriate for the correction amount of other portions of the image where non-uniform self-illumination occurs.

In a stand image scanner, since there is a physical limit to how far away the light source of the lighting device can be placed to try and make the self-illumination illuminate the original uniformly, it is difficult to illuminate a large size original (for example an A3 paper size original) uniformly with self-illumination.

Moreover, such a stand image scanner is not constructed with a cover to stop light from the periphery of the set original illuminating the original, such as in an ordinary photocopier. Hence not only self-illumination light but also peripheral light such as interior lighting is illuminated onto the original, and even supposing the peripheral light is illuminated substantially uniformly onto the original, combined light illuminated onto the original, of both the peripheral light and the self-illumination light combined, has a non-uniform color when the self-illumination is non-uniform. Namely the color tone of the peripheral light is stronger at locations with low illumination by the self-illumination light, and the color tone of the self-illumination light is stronger at locations where there is high illumination with the self-illumination light.

FIG. 11A illustrates an original image with the color of the original itself, and FIG. 11B illustrates an example of an original image when the original is read with the stand image scanner 80 as illustrated in FIG. 10. As illustrated in FIG. 11B, when the original is read with the stand image scanner 80, an image is produced in which the central portion of the original is brighter and the peripheral edge portions are darker due to the self-illumination illuminating the original non-uniformly. It is accordingly difficult to appropriately correct the color of the whole image even when ordinary white balance correction is performed on an image read by the stand image scanner 80.

There is also technology to correct image data when an image on an original is read using plural line sensors. Such correction is based on a received light intensity of reflected light from a standard white color sample for accurately determining shading correction coefficients for each pixel and based on a maximum value of line image data read by the line sensor.

In this technology accurate color shift correction can be achieved in an environment under self-illumination alone and without the influence of peripheral light.

RELATED PATENT DOCUMENTS

Japanese Laid-Open Patent Publication (JP-A) No. 2002-171388
JP-A No. 2008-199556
JP-A No. 2003-101772
JP-A No. 2004-150873

SUMMARY

According to an aspect of the embodiments, an image correction device is provided. The image correction device includes a processor; and a memory storing instructions, which when executed by the processor perform a procedure. The procedure includes: (a) controlling an image reading apparatus including an illumination section that illuminates self-illumination light onto a read object in a state in which peripheral light is being illuminated from a periphery of the read object onto the read object, a standard color chart that is provided in an illuminated region illuminated by the self-illumination light and outside of a mounting region where the read object is mounted, a reading section that reads an image of the read object and reads an image of the standard color chart, and a storage section that stores a self-illuminated reference chart image of a reference chart of size corresponding to the mounting region that has been read in advance by the reading section in a state illuminated by only the self-illumination light, that stores a uniform light standard color chart image of the standard color chart that has been read in advance by the reading section in a state illuminated by only uniform light from a predetermined uniform light source, and that stores a uniform light reference chart image of the reference chart that has been read in advance by the reading section in a state illuminated by only the uniform light, by controlling the illumination section and the reading section such that an image of the read object is read in a state illuminated by combined light in which the peripheral light and the self-illumination light are combined, and such that a peripheral light standard color chart image of the standard color chart is read in a state illuminated by only the peripheral light; and (b) correcting the image of the read object based on the self-illuminated reference chart image, the uniform light standard color chart image and the uniform light reference chart image stored in the storage section, and based on the image of the read object and the peripheral light standard color chart image read by the reading section.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Detailed explanation follows regarding an example of an exemplary embodiment of technology disclosed herein, with reference to the drawings.

First Exemplary Embodiment

Figure 1:
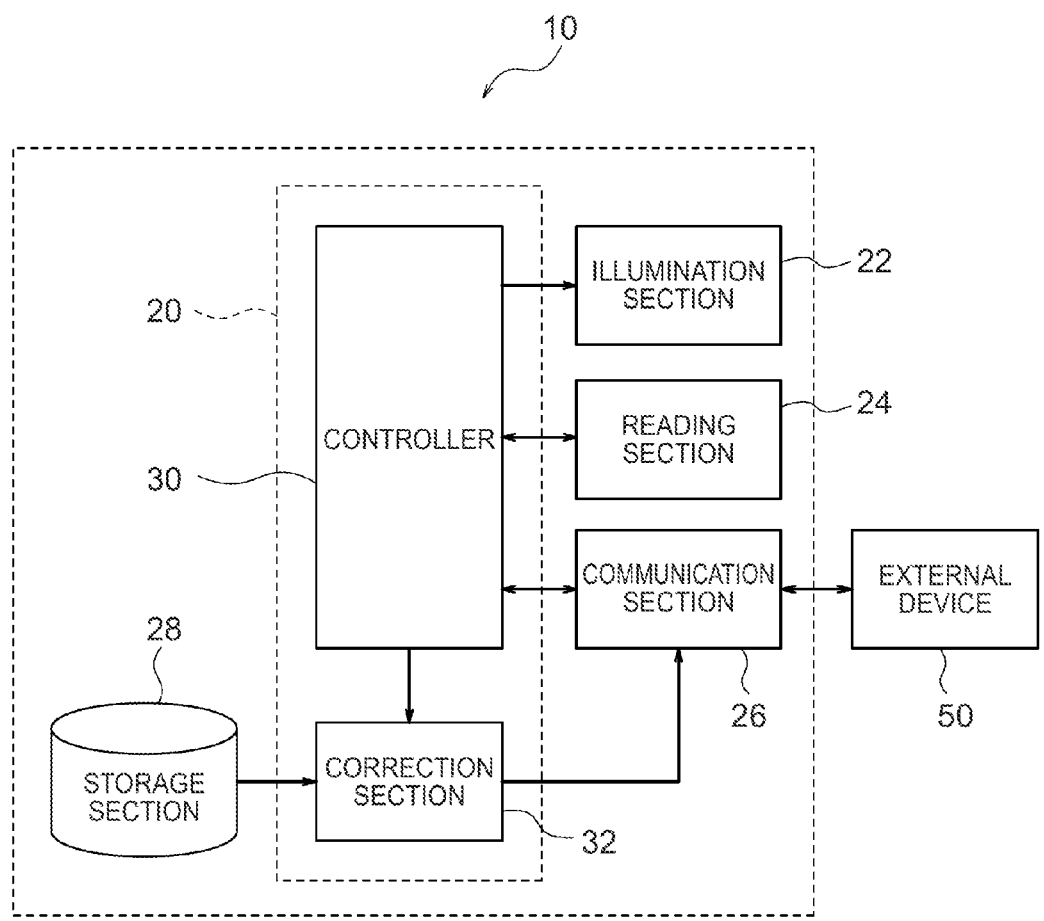
FIG. 1 is a functional block diagram of an image correction device according to a first exemplary embodiment.

FIG. 1 illustrates an image reading apparatus 10 according to the present exemplary embodiment. The image reading apparatus 10 includes an image correction device 20, an illumination section 22, a reading section 24, a communication section 26 and a storage section 28. The image correction device 20 includes a controller 30 and a correction section 32.

Figure 2:
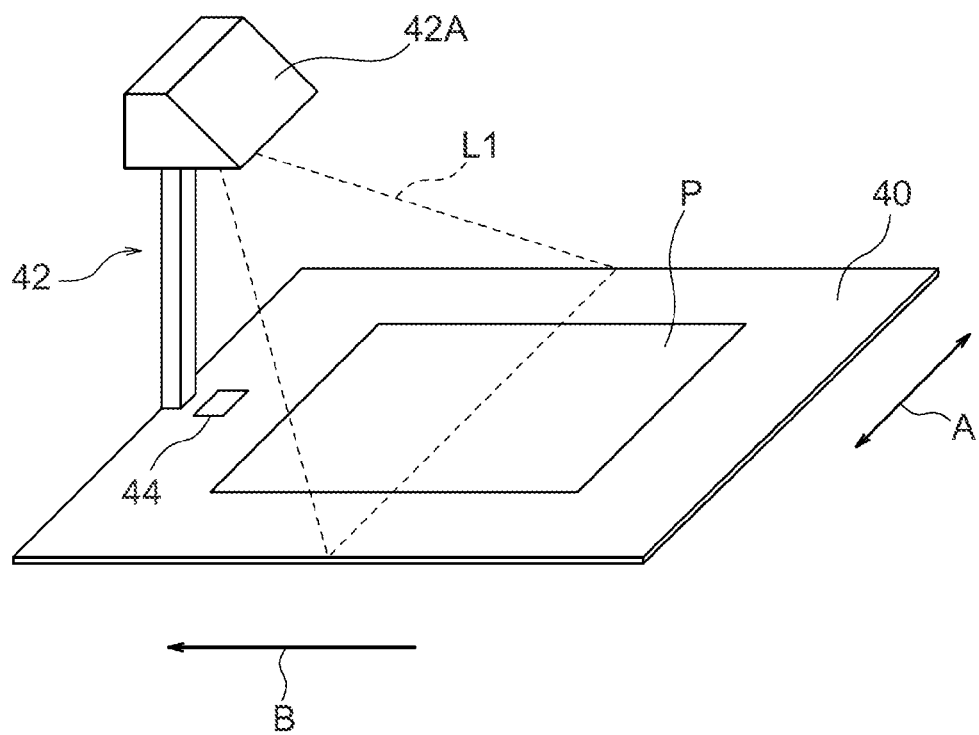
FIG. 2 is an external view of an image reading apparatus according to the first exemplary embodiment.

FIG. 2 illustrates an external view of the image reading apparatus 10. As illustrated in FIG. 2, in the image reading apparatus 10 a stand 42 is attached to a mounting base 40 for mounting a read object, such as an original P. The illumination section 22 and the reading section 24 (see also FIG. 1) are provided to a head 42A of the stand 42. Note that the read object is not limited to a sheet of paper-shaped read object such as an original document, and may have a shape that has thickness, such as a book.

The image reading apparatus 10 is, as illustrated in FIG. 1, connected through the communication section 26 to an external device 50 such as for example a personal computer, and under instruction from the external device 50 the image reading apparatus 10 reads an image on the original P mounted on the mounting region of the mounting base 40. The read image is then corrected by the image correction device 20 and transmitted through the communication section 26 to the external device 50. Note that the communication section 26 may for example communicate with the external device 50 through a communication interface such as a Universal Serial Bus (USB).

As illustrated in FIG. 2, a standard color chart 44 is provided on the mounting base 40 at a location positioned in an illuminated region illuminated by self-illumination light from the illumination section 22, and outside of the mounting region where the original P is mounted. Note that the standard color chart 44 may for example be a color chart of uniform white over the entire surface, but preferably is a color chart of another color. The standard color chart 44 preferably has a basically uniform color over the entire surface. However even when color is not uniform over the entire surface a representative value may be computed, such as the average value of pixel values (color values) for each pixel in a range of the standard color chart 44, and this representative value employed as a color value of the standard color chart 44. The standard color chart 44 may be a size significantly smaller than the original P mounting region, and for example may be a size to obtain an image in four directions of several pixels to several tens of pixels.

The illumination section 22 has a line shaped illumination light with a length direction along a first direction A and illuminates the original P and the standard color chart 44 while scanning in a second direction B orthogonal to the first direction A. The illumination section 22 employs a light source such as for example a fluorescent tube or LEDs.

As illustrated in FIG. 2, the illumination section 22 is configured provided to the head 42A of the stand 42, and so not only the self-illumination light from the illumination section 22 is illuminated onto the original P and the standard color chart 44, but also peripheral light from the periphery of the image reading apparatus 10 is also illuminated thereon. Combined light in which the self-illumination light and the peripheral light is combined is accordingly illuminated onto the original P when the original P and the standard color chart 44 are read.

The reading section 24 is a line shaped reading sensor with length direction along the first direction A that reads an image of the original P and the standard color chart 44 while scanning along the second direction B. The reading section 24 employs for example a line Charge Coupled Device (CCD) image sensor for each color R, G, B. Note that a monochrome line CCD image sensor may also be employed. The reading section 24 is synchronized with the illumination section 22 and reads an image of the region that is being illuminated by the line shaped self-illumination light using the illumination section 22.

Figure 3:
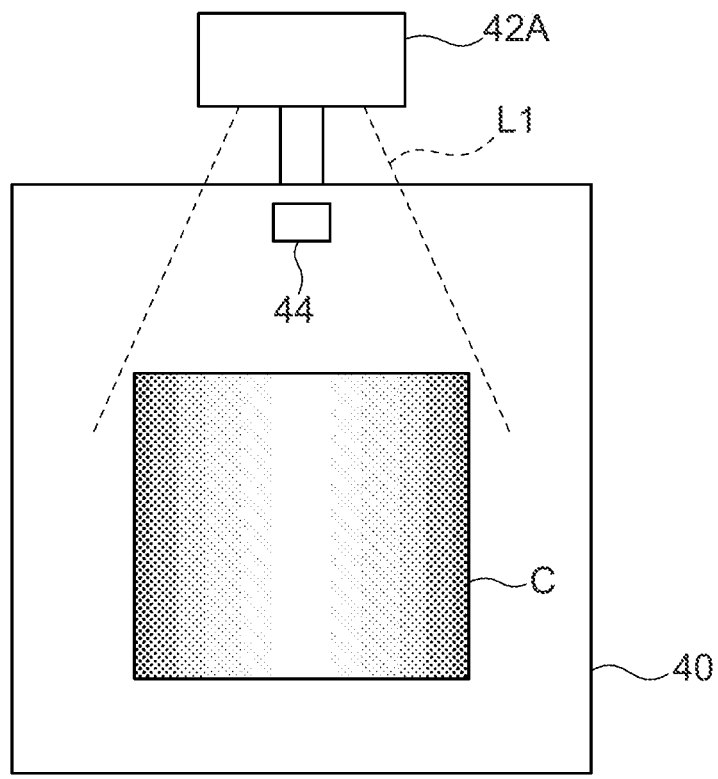
FIG. 3 is an explanatory diagram regarding reading of a self-illuminated reference chart image.

The storage section 28 is stored with a self-illuminated reference chart image of a reference chart C mounted on the mounting region of the mounting base 40 and read in advance by the reading section 24 in a state illuminated by only self-illumination light L1 from the illumination section 22, as illustrated in FIG. 3. The self-illuminated reference chart image is acquired for example at manufacturing factory shipment, and is pre-stored in the storage section 28. The reference chart C has a size corresponding to the mounting region of the mounting base 40, namely a size corresponding to a region of the original read by the reading section 24, and for example white paper or white board may be employed therefor. Note that configuration with a white board pre-installed to the mounting base may also be employed.

Figure 4:
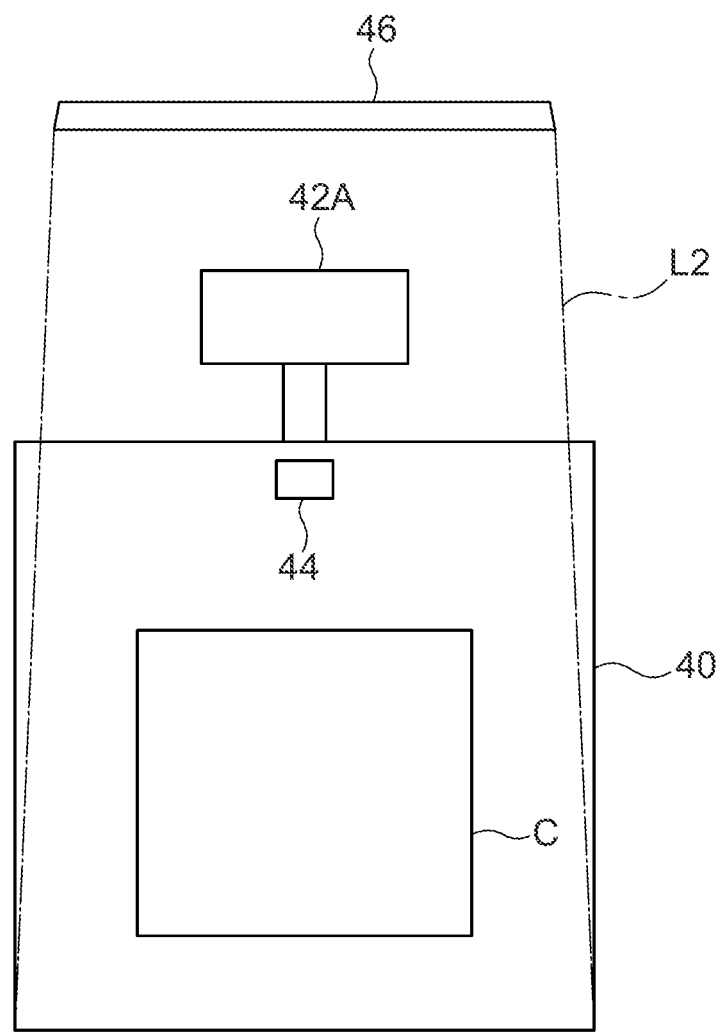
FIG. 4 is a schematic diagram to explain reading of a uniform light standard color chart image.

The storage section 28 is also stored with a uniform light standard color chart image of the standard color chart 44 that has been read in advance by the reading section 24 in a state illuminated by only uniform light L2 from a predetermined uniform light source 46, as illustrated in FIG. 4. This uniform light reference chart image may also be acquired for example at manufacturing factory shipment and stored in advance in the storage section 28.

The storage section 28 is also stored with a uniform light reference chart image of the reference chart C that has been read in advance by the reading section 24 in a state illuminated by only the uniform light L2 from the uniform light source 46, as illustrated in FIG. 4. The uniform light source 46 is a light source that illuminates light uniformly onto the whole region of the standard color chart 44 and the reference chart C.

Note that the reference chart is not limited to white and another color may be employed therefor. There is also no limitation to a single color and two or more colors may be employed. That is to say there is no limit to the type or number of colors as long as the reference chart employed when reading the reference chart in a state illuminated by only the self-illumination light is the same as the reference chart employed when reading the reference chart in a state illuminated by the uniform light.

The controller 30 reads an image of the original P in a state illuminated with the combined light in which the peripheral light at the periphery of the image reading apparatus 10 and the self-illumination light have been combined. The controller 30 also controls the illumination section 22 and the reading section 24 so as to read a peripheral light standard color chart image of the standard color chart 44 in a state illuminated with only the peripheral light, namely in a state in which illumination from the illumination section 22 is switched off.

The correction section 32 corrects the image of the original P based on the self-illuminated reference chart image, the uniform light standard color chart image and the uniform light reference chart image stored in the storage section 28, and based on the image of the original P and the peripheral light standard color chart image read by the reading section 24.

Figure 5:
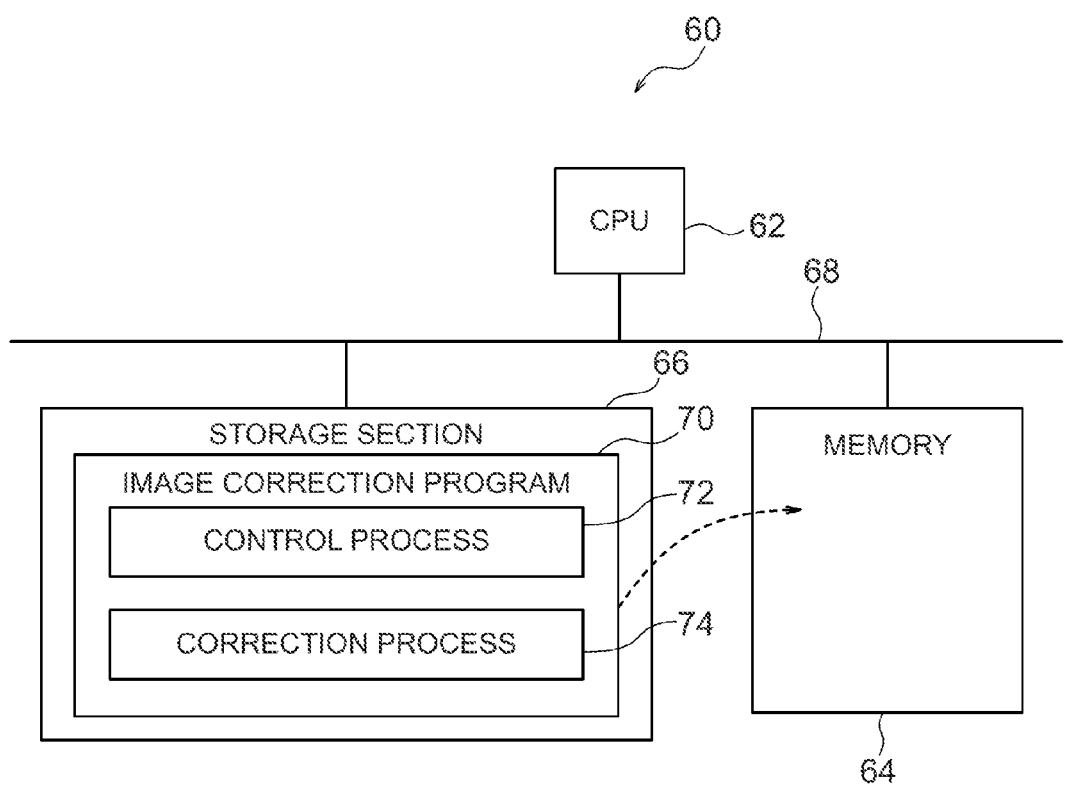
FIG. 5 is a schematic block diagram of a computer functioning as an image correction device.

The image correction device 20 may for example be realized by a computer 60 as illustrated in FIG. 5. The computer 60 includes a CPU 62, a memory 64 and a nonvolatile storage section 66, with these sections connected to each other through a bus 68.

The storage section 66 may be realized for example by a Hard Disk Drive (HDD) or a flash memory. An image correction program 70 that causes the computer 60 to function as the image correction device 20 is stored on the storage section 66 serving as a recording medium. The CPU 62 reads the image correction program 70 from the storage section 66, expands the image correction program 70 in the memory 64, and sequentially executes processes contained in the image correction program 70.

The image correction program 70 includes a control process 72 and a correction process 74. The CPU 62 operates as the controller 30 illustrated in FIG. 1 by executing the control process 72. The CPU 62 operates as the correction section 32 illustrated in FIG. 1 by executing the correction process 74.

The computer 60 that executes the image correction program 70 thereby functions as the image correction device 20.

Note that the image correction program 70 is an example of an image correction program of the technology disclosed herein.

Note that the image correction device 20 may be realized for example by a semiconductor integrated circuit, or more specifically by an Application Specific Integrated Circuit (ASIC).

Figure 6:
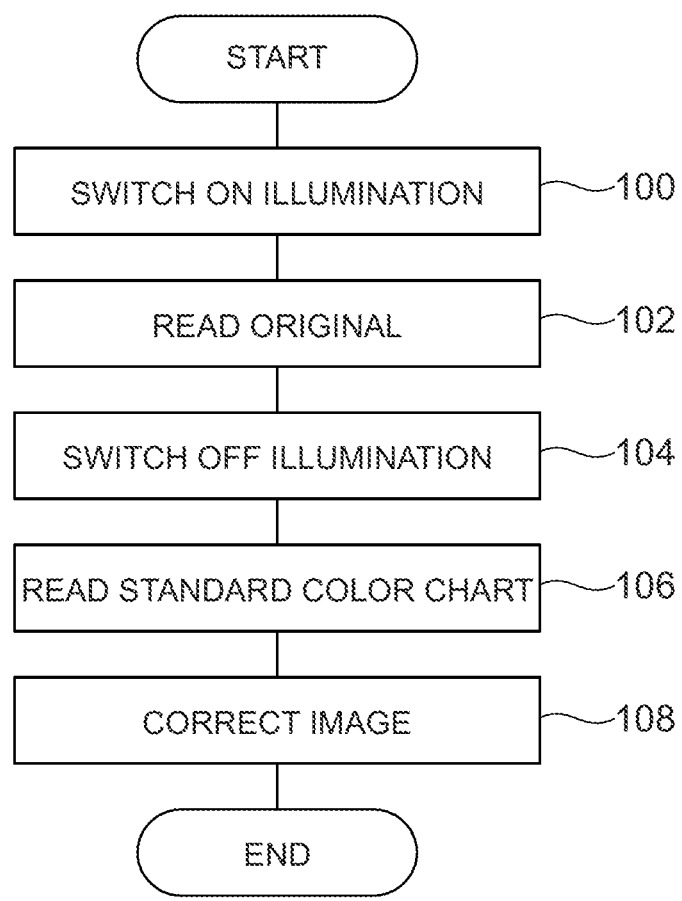
FIG. 6 is a flow chart illustrating an example of image correction processing according to the first exemplary embodiment.

Explanation follows regarding operation of the first exemplary embodiment. An instruction to read the original P is transmitted to the image correction device 20 through the communication section 26 when a user has mounted the original P on the mounting base 40 and instructed reading of the original P by operating the external device 50. The image correction processing illustrated in FIG. 6 is accordingly executed by the image correction device 20.

Figure 7:
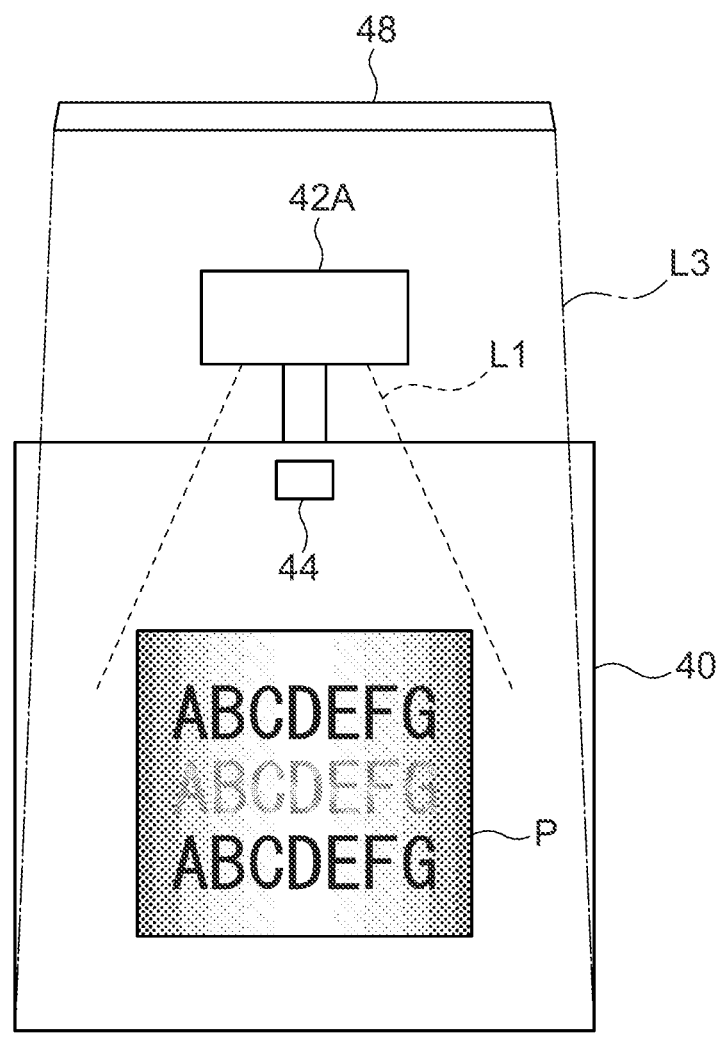
FIG. 7 is an explanatory diagram regarding reading of an original.

At step 100, the controller 30 switches on the illumination section 22. The original P is thereby illuminated by the self-illumination light L1, as illustrated in FIG. 7. The original P is also illuminated by peripheral light L3 from a peripheral light source 48 at the periphery of the location of the image reading apparatus 10. Note that when the image reading apparatus 10 is disposed in a user's room and lighting equipment provided on the ceiling of the room is in an on state, then the peripheral light source 48 represents this lighting equipment, and the peripheral light L3 is light from this lighting equipment. When this lighting equipment is in an off state, then the peripheral light L3 represents light shining into the room, for example from a window. Such peripheral light L3 is light that is illuminated from a position sufficiently distanced from the original P in comparison to the illumination section 22 and so may be considered to be being substantially uniform.

At step 102, the controller 30 controls the reading section 24 so as to read an image of the original P in a state illuminated by the combined light in which the peripheral light L3 and the self-illumination light L1 are combined.

Specifically, the controller 30 controls the illumination section 22 such that the self-illumination light L1 from the illumination section 22 is illuminated towards the original P from the arrow B direction upstream side to the downstream side in FIG. 2. The controller 30 also controls the reading section 24 in synchronization with the control of the illumination section 22 so as to read sequential line images along the arrow A direction of the original P from the arrow B direction upstream side. The original P is accordingly scanned from the arrow B direction upstream side towards the downstream side, and an image (image in R, G, B) is read of the original P.

When reading of the image of the original P is completed, at step 104 the controller 30 switches off the illumination section 22.

Figure 8:
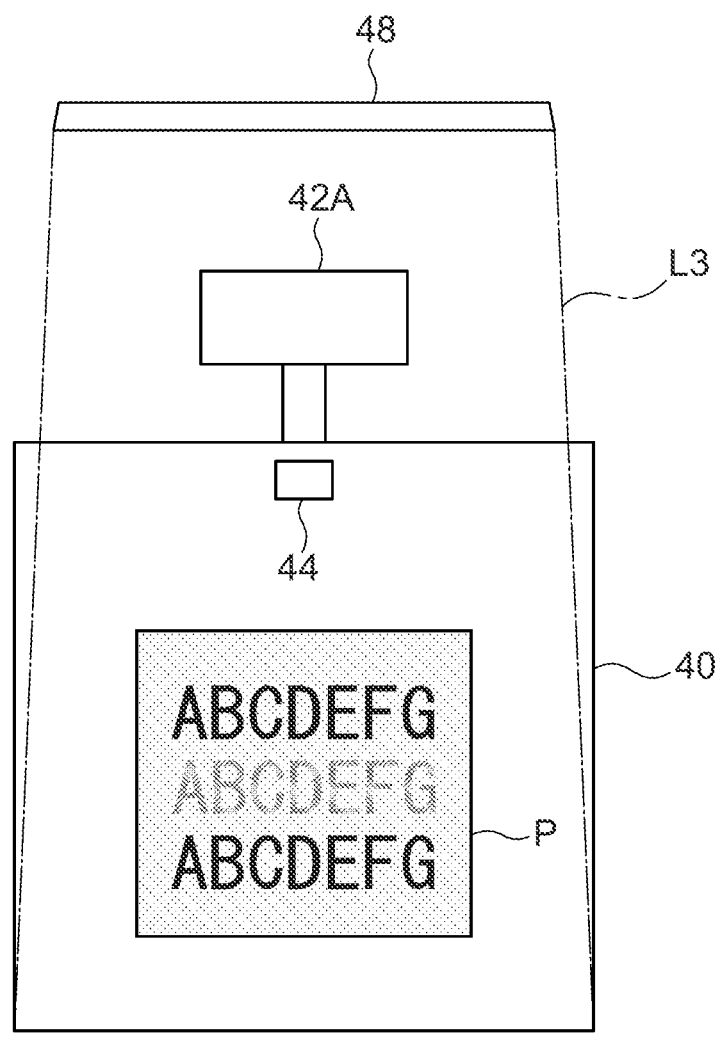
FIG. 8 is a diagram for explaining reading of a peripheral light standard color chart image.

At step 106, the controller 30 controls the reading section 24 so as to read an image of the standard color chart 44. Accordingly, a peripheral light standard color chart image (respective images in R, G, B) is read of the standard color chart 44 in a state illuminated by only the peripheral light L3, as illustrated in FIG. 8.

The reading time can accordingly be shortened due to executing reading of the original P and reading of the standard color chart 44 by a single scan.

At step 108, the correction section 32 corrects the image of the original P based on the self-illuminated reference chart image, the uniform light standard color chart image and the uniform light reference chart image stored in the storage section 28, and based on the image of the original P and the peripheral light standard color chart image read by the reading section 24. Note that the correction is performed for each of the R, G, B color images.

More specifically, the correction section 32 computes an average value of the pixel values of the uniform light standard color chart image stored in the storage section 28, referred to as uniform light intensity A1. Note that a pre-computed intensity A1 may be pre-stored in the storage section 28. The correction section 32 then computes an average value of the pixel values of the peripheral light standard color chart image, referred to as peripheral light intensity A2. Note that there is no limitation to an average value of the pixel values, and a median value, a maximum value, or a pixel value of a predetermined representative pixel may be employed as the intensity. The correction section 32 computes a peripheral light intensity ratio H1 of the peripheral light L3 with respect to the uniform light L2 (=A2/A1).

Strictly speaking the peripheral light intensity ratio H1 is an intensity ratio of the peripheral light L3 with respect to the uniform light L2 at the location of the standard color chart 44. However, since lighting equipment provided to a ceiling in for example an interior environment is generally at a distance far away from the original P, the intensity of the peripheral light L3 may be considered to be uniform over the whole of the original P. Consequently, the peripheral light intensity ratio H1 may also be taken as being uniform over the entire original P.

The correction section 32 then multiplies the pixel values of each of the pixels of the uniform light reference chart image D1 by the peripheral light intensity ratio H1. The image obtained by D1×H1 may be considered to be an image of the reference chart C in a state illuminated by only the peripheral light L3.

The correction section 32 then computes respective correction coefficients K1 for each of the pixels by adding pixel values of corresponding pixels of the self-illuminated reference chart image D2 to respective pixel values of each of the pixels of the uniform light reference chart image D1 that have been multiplied by the peripheral light intensity ratio H1. These correction coefficients K1 (=D1×H1+D2) are configured by adding an image of the reference chart C when illuminated by only the self-illumination light L1 to an image of the reference chart C when illuminated by only the peripheral light L3. Consequently, the image represented by the correction coefficients K1 may be considered to be an image when the reference chart C is illuminated by combined light of the peripheral light L3 and the self-illumination light L1.

The correction section 32 then divides the pixel values of corresponding pixels of the image D3 of the original P read at step 102 by the respective correction coefficients K1 for each of the pixels. The image obtained by D3/K1 may be considered to be an image D4 of the original P itself in a state not illuminated by the combined light.

The correction section 32 then multiplies the pixel values of the corresponding pixels of the self-illuminated reference chart image D2 by the respective pixel values of each of the pixels of the image D4 of the corrected original P. The image obtained by D4×D2 may be considered to be an image D5 of the original P in a state only illuminated by the self-illumination light. The correction section 32 then transmits the corrected image D5 to the external device 50 through the communication section 26.

Thus in the first exemplary embodiment, the image of the original P that has been read is corrected to an image of the original P read by considering not only the illumination light but also the effect of peripheral light, enabling an image to be corrected with good precision even when the original P is read in an environment illuminated by the peripheral light and the self-illumination light. Moreover, the image of the original P and the image of the standard color chart 44 may be read by a single scan, and there is no need to read an image of the original P two times, such as by switching on the self-illumination light and reading an image of the original P, then switching off the self-illumination light and re-reading an image of the original P. A significant shortening of the reading time is accordingly enabled.

Note that although in the first exemplary embodiment the image of the standard color chart 44 is read after an image of the original P has been read, the reverse sequence is also possible.

However, when it takes some time from switching on a light until a stable light intensity is achieved and some time to start up the reading section 24, this means that when the image of the standard color chart 44 is read first, after first waiting for the reading section 24 to start up and reading the image of the standard color chart 44, the lighting is then switched on and the image of the original P is read only after waiting for the light intensity to stabilize. The time for reading is accordingly increased. However, when the image of the original P is read first, this enables the time from switching on the lighting until the light intensity stabilizes to be overlapped with the time for starting up the reading section 24, and so any increase in the time for reading can be suppressed.

Second Exemplary Embodiment

Explanation follows regarding a second exemplary embodiment of technology disclosed herein. Note that portions similar to those of the first exemplary embodiment are allocated the same reference numerals and further explanation is omitted, and only the parts that differ from the first exemplary embodiment will be explained.

In the second exemplary embodiment explanation follows regarding a case in which correction of an image of an original P is performed with consideration to deterioration of an illumination section 22.

In the present exemplary embodiment, a storage section 28 is stored with a self-illuminated standard color chart image of the standard color chart 44 read in advance by the reading section 24 in a state illuminated by only the self-illumination light L1, for example at manufacturing factory shipment.

Figure 9:
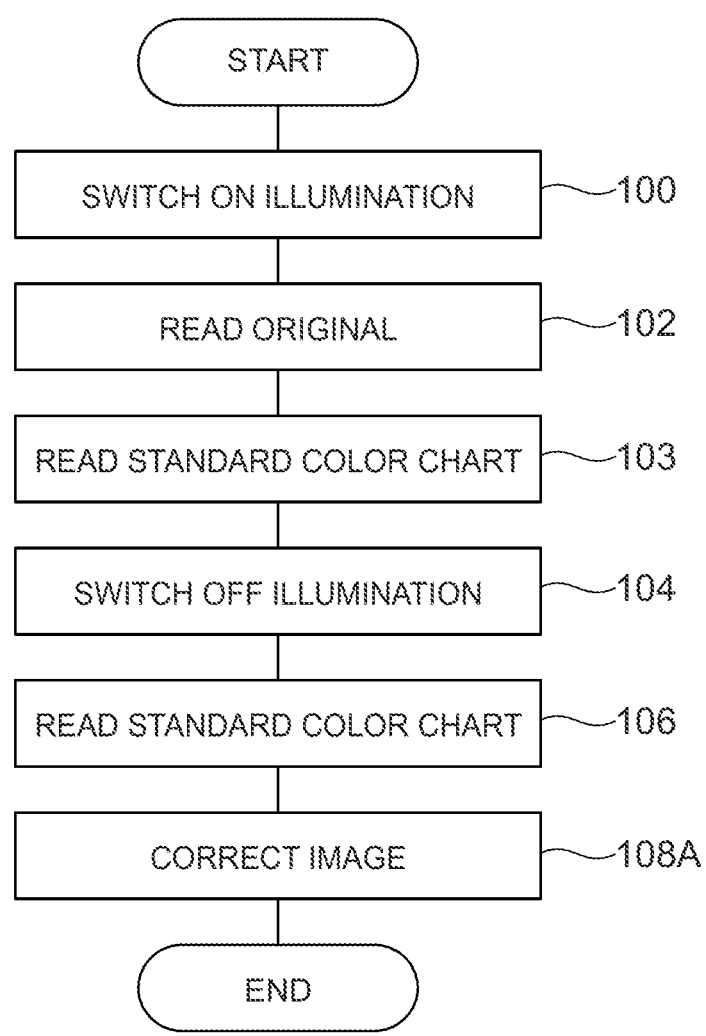
FIG. 9 is a flow chart illustrating an example of image correction processing according to a second exemplary embodiment.
Figure 10:
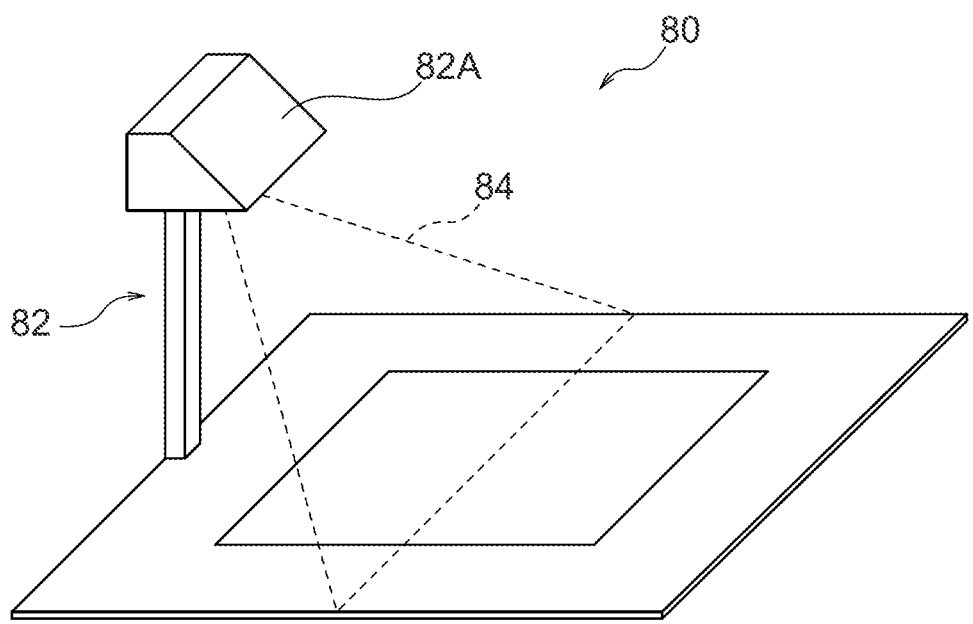
FIG. 10 is an external view of an image reading apparatus according to related technology.
Figure 11A:
FIG. 11A is a diagram illustrating a related example of an image on an original.
Figure 11B:
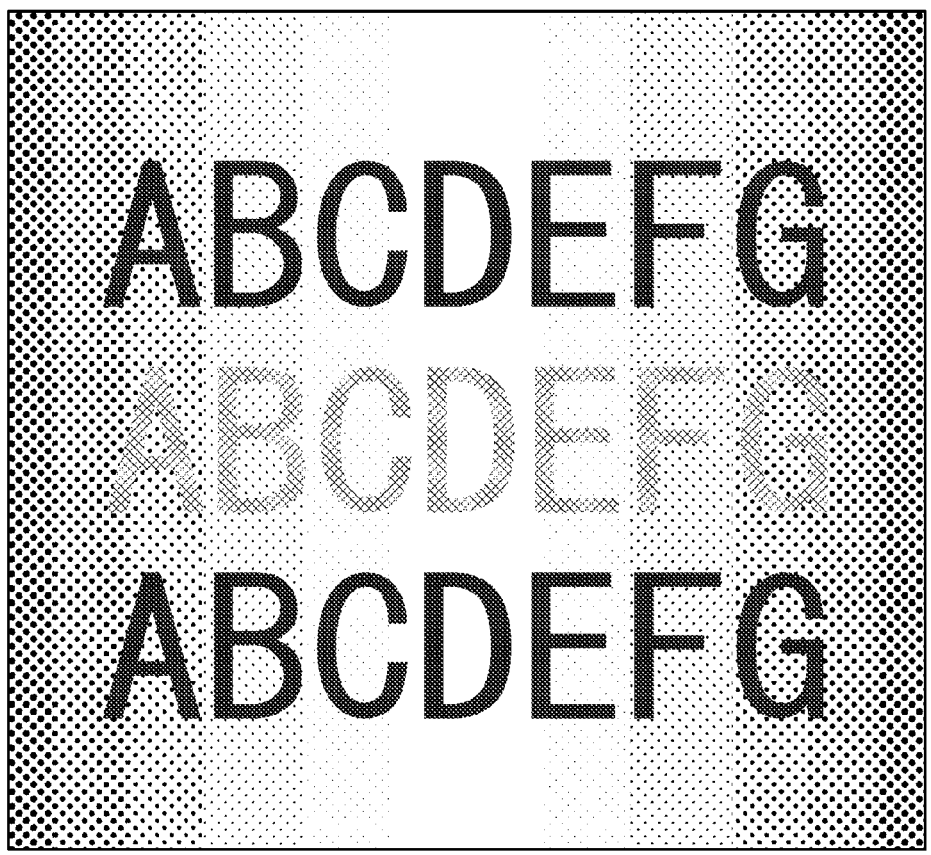
FIG. 11B is a diagram illustrating a related example of an image of an original illuminated by self-illumination.

FIG. 9 illustrates a flow chart of image correction processing according to the second exemplary embodiment. The flow chart in FIG. 9 differs from the flow chart according to the first exemplary embodiment illustrated in FIG. 6 in that processing of step 103 has been added and also in the image correction processing of step 108A.

At step 103, after reading the image of the original P at step 102, the controller 30 leaves the illumination section 22 on and proceeds to read an image of the standard color chart 44. A combined light standard color chart image D6 of the standard color chart 44 read in a state illuminated with combined light in which the peripheral light L3 and the self-illumination light L1 is combined is accordingly obtained.

At step 108A, the correction section 32 first computes an average value of the pixel values of the combined light standard color chart image D6, referred to as a combined light intensity A3.

The correction section 32 then computes an average value of the pixel values of the self-illuminated standard color chart image stored in the storage section 28, referred to as light intensity A4 of the self-illumination light (the intensity of self-illumination light for example at manufacturing factory shipment).

The correction section 32 then subtracts the intensity A2 of peripheral light from the light intensity A3 of combined light.

The intensity represented thereby (A3−A2) may be considered to be a current self-illumination light intensity A5.

The correction section 32 then computes a self-illumination light intensity ratio H2 (=A5/A4) of the current intensity of self-illumination light with respect to the intensity of self-illumination light for example at the time of manufacturing factory shipment.

The correction section 32 then, similarly to in the first exemplary embodiment, computes a peripheral light intensity ratio H1 (=A2/A1) of the peripheral light L3 with respect to the uniform light L2 and multiplies the pixel values of each of the pixels of the uniform light reference chart image D1 by the peripheral light intensity ratio H1.

The correction section 32 then computes respective correction coefficients K2 for each of the pixels by adding the pixel values of the corresponding pixels of the self-illuminated reference chart image D2 that have been multiplied by the self-illumination light intensity ratio H2 to the respective pixel values of each of the pixels of the uniform light reference chart image D1 that have been multiplied by the peripheral light intensity ratio H1. Subsequent processing is similar to that of the first exemplary embodiment.

Thus in the second exemplary embodiment, the image of the original P is corrected using the correction coefficients K2 that employ the self-illumination light intensity ratio H2, this being the ratio of the current intensity of the self-illumination light to the intensity of the self-illumination light for example at manufacturing factory shipment. Thus correction with good precision is enabled even when the intensity of the self-illumination light has fallen due for example to deterioration over time.

Note that in the second exemplary embodiment, the image of the standard color chart 44 is read after reading the image of the original P with the illumination section 22 switched on, and the image of the standard color chart 44 is then read with the illumination section 22 switched off, however the opposite sequence may be employed. In such cases, the image of the standard color chart 44 is read with the illumination section 22 in an off state, then the standard color chart 44 is read with the illumination section 22 switched on, and the image of the original P is read with the illumination section 22 remaining switched on.

In the above, explanation has been given of cases in which the self-illuminated reference chart image, the uniform light standard color chart image and the uniform light reference chart image are acquired for example at manufacturing factory shipment and stored in the storage section 28, however there is no limitation thereto. For example, these images may be user acquired in the environment of use of the image reading apparatus 10 by the user. In such cases the uniform light source 46 becomes the same as the peripheral light source 48, and correction of the read image of the original P with good precision is enabled.

Explanation has been given above of a case in which a line CCD image sensor is employed as the reading section 24, however an area image sensor may be employed that is capable of reading a region containing the standard color chart 44 and the original P all at once. In such cases the illumination section 22 employs a light source capable of illuminating self-illumination light L1 onto the whole of the region containing the standard color chart 44 and the original P at the same time. In such cases there is a need to switch on the illumination section 22 and read an image of standard color chart 44 and the original P, and to switch off the illumination section 22 and read an image of the standard color chart 44 and the original P.

Moreover, although in the above explanation has been given of an embodiment in which the image correction program 70 serving as an example of an image correction program according to the technology disclosed herein is pre-stored (pre-installed) in the storage section 66 there is no limitation thereto. The image correction program according to technology disclosed herein may be provided in a state stored on a recording medium such as a CD-ROM or DVD-ROM.

All cited documents, patent applications and technical standards mentioned in the present specification are incorporated by reference in the present specification to the same extent as if the individual cited documents, patent applications and technical standards were specifically and individually incorporated by reference in the present specification.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image correction device comprising:
a processor; and
a memory storing instructions, which when executed by the processor perform a procedure, the procedure including:
(a) controlling an image reading apparatus including an illumination section that illuminates self-illumination light from a first light source onto a read object in a state in which peripheral light from a second light source different than the first light source is being illuminated from a periphery of the read object onto the read object, a standard color chart that is provided in an illuminated region illuminated by the self-illumination light and outside of a mounting region where the read object is mounted, a reading section that reads an image of the read object and reads an image of the standard color chart, and a storage section that stores a self-illuminated reference chart image of a reference chart of size corresponding to the mounting region that has been read in advance by the reading section in a state illuminated by only the self-illumination light, that stores a uniform light standard color chart image of the standard color chart that has been read in advance by the reading section in a state illuminated by only uniform light from a predetermined uniform light source that illuminates light uniformly on a whole region of the standard color chart and the reference chart, and that stores a uniform light reference chart image of the reference chart that has been read in advance by the reading section in a state illuminated by only the uniform light, by controlling the illumination section of the image reading apparatus and the reading section such that an image of the read object is read in a state illuminated by combined light in which the peripheral light and the self-illumination light are combined, and such that a peripheral light standard color chart image of the standard color chart is read in a state illuminated by only the peripheral light when the illumination section is off and peripheral light is illuminated; and (b) correcting the image of the read object based on the self-illuminated reference chart image, the uniform light standard color chart image and the uniform light reference chart image stored in the storage section, and based on the image of the read object and the peripheral light standard color chart image read by the reading section, wherein the standard color chart is used to compute a peripheral light intensity ratio of the peripheral light with respect to the uniform light.

2. The image correction device of claim 1, wherein in (b), the peripheral light intensity ratio of the peripheral light with respect to the uniform light is computed based on the uniform light standard color chart image and the peripheral light standard color chart image, pixel values of each pixel of the uniform light reference chart image are multiplied by the peripheral light intensity ratio, and respective correction coefficients are computed for each pixel by adding the pixel values of corresponding pixels of the self-illuminated reference chart image to the respective pixel values of each of the pixels that have been multiplied by the peripheral light intensity ratio, and an image of the read object in a state not illuminated by the combined light is generated by dividing the pixel values of the corresponding pixels of the image of the read object by the respective correction coefficients.

3. The image correction device of claim 2, wherein in (b) an image of the read object in a state illuminated by only the self-illumination light is generated by multiplying pixel values of corresponding pixels of the self-illuminated reference chart image by respective pixel values of each of the pixels of the image of the read object in a state not illuminated by the combined light.

4. The image correction device of claim 1, wherein:

the reading section is a line shaped read sensor that has a length direction along a first direction and that reads an image of the read object while scanning in a second direction orthogonal to the first direction; and in (a) the illumination section and the reading section are controlled such that in a single scan an image of the read object is read in a state illuminated by the peripheral light and the self-illumination light and a peripheral light standard color chart image of the standard color chart is read in a state illuminated by only the peripheral light.

5. The image correction device of claim 4, wherein in (a) the illumination section and the reading section are controlled such that in a single scan the peripheral light standard color chart image of the standard color chart is read in a state illuminated by only the peripheral light after the image of the read object has been read in a state illuminated by the peripheral light and the self-illumination light.

6. The image correction device of claim 2, wherein:

the storage section stores a self-illuminated standard color chart image of the standard color chart read in advance by the reading section in a state illuminated by only the self-illumination light;

in (a) the illumination section and the reading section are controlled such that a combined light standard color chart image of the standard color chart is read in a state illuminated by the combined light; and in (b) a self-illumination light intensity ratio is further computed of the self-illumination light when the combined light standard color chart image is read with respect to the self-illumination light when the self-illuminated standard color chart image was read in advance, based on the combined light standard color chart image, the peripheral light standard color chart image and the self-illuminated standard color chart image, and respective correction coefficients are computed for each of the pixels by adding pixel values of corresponding pixels of the self-illuminated reference chart image that have been multiplied by the self-illumination light intensity ratio to respective pixel values of each of the pixels of the uniform light reference chart image that have been multiplied by the peripheral light intensity ratio.

7. An image correction method comprising:

(a) controlling, by a processor, an image reading apparatus including an illumination section that illuminates self-illumination light from a first light source onto a read object in a state in which peripheral light from a second light source different than the first light source is being illuminated from a periphery of the read object onto the read object, a standard color chart that is provided in an illuminated region illuminated by the self-illumination light and outside of a mounting region where the read object is mounted, a reading section that reads an image of the read object and reads an image of the standard color chart, and a storage section that stores a self-illuminated reference chart image of a reference chart of size corresponding to the mounting region that has been read in advance by the reading section in a state illuminated by only the self-illumination light, that stores a uniform light standard color chart image of the standard color chart that has been read in advance by the reading section in a state illuminated by only uniform light from a predetermined uniform light source that illuminates light uniformly on a whole region of the standard color chart and the reference chart, and that stores a uniform light reference chart image of the reference chart that has been read in advance by the reading section in a state illuminated by only the uniform light, by controlling the illumination section of the image reading apparatus and the reading section such that an image of the read object is read in a state illuminated by the peripheral light and by the self-illumination light, and such that a peripheral light standard color chart image of the standard color chart is read in a state illuminated by only the peripheral light when the illumination section is off and peripheral light is illuminated; and (b) correcting, by the processor, the image of the read object based on the self-illuminated reference chart image, the uniform light standard color chart image and the uniform light reference chart image stored in the storage section, and based on the image of the read object and the peripheral light standard color chart image read by the reading section, wherein the standard color chart is used to compute a peripheral light intensity ratio of the peripheral light with respect to the uniform light.

8. A non-transitory computer-readable recording medium having stored therein a program for causing a computer to execute an image correction process comprising:

(a) controlling an image reading apparatus including an illumination section that illuminates self-illumination light from a first light source onto a read object in a state in which peripheral light from a second light source different than the first light source is being illuminated from a periphery of the read object onto the read object, a standard color chart that is provided in an illuminated region illuminated by the self-illumination light and outside of a mounting region where the read object is mounted, a reading section that reads an image of the read object and reads an image of the standard color chart, and a storage section that stores a self-illuminated reference chart image of a reference chart of size corresponding to the mounting region that has been read in advance by the reading section in a state illuminated by only the self-illumination light, that stores a uniform light standard color chart image of the standard color chart that has been read in advance by the reading section in a state illuminated by only uniform light from a predetermined uniform light source that illuminates light uniformly on a whole region of the standard color chart and the reference chart, and that stores a uniform light reference chart image of the reference chart that has been read in advance by the reading section in a state illuminated by only the uniform light, by controlling the illumination section of the image reading apparatus and the reading section such that an image of the read object is read in a state illuminated by the peripheral light and the self-illumination light, and such that a peripheral light standard color chart image of the standard color chart is read in a state illuminated by only the peripheral light when the illumination section is off and peripheral light is illuminated; and (b) correcting the image of the read object based on the self-illuminated reference chart image, the uniform light standard color chart image and the uniform light reference chart image stored in the storage section, and based on the image of the read object and the peripheral light standard color chart image read by the reading section, wherein the standard color chart is used to compute a peripheral light intensity ratio of the peripheral light with respect to the uniform light.

9. An image reading apparatus comprising:

an illumination section that illuminates self-illumination light from a first light source onto a read object in a state in which peripheral light from a second light source different than the first light source is being illuminated from a periphery of the read object onto the read object;

a standard color chart that is provided in an illuminated region illuminated by the self-illumination light and outside of a mounting region where the read object is mounted;

a reading section that reads an image of the read object and reads an image of the standard color chart;

a storage section that stores a self-illuminated reference chart image of a predetermined reference chart that has been read in advance by the reading section in a state illuminated by the self-illumination light, that stores a uniform light standard color chart image of the standard color chart that has been read in advance by the reading section in a state illuminated by only uniform light from a predetermined uniform light source that illuminates light uniformly on a whole region of the standard color chart and the reference chart, and that stores a uniform light reference chart image of the reference chart that has been read in advance by the reading section in a state illuminated by the uniform light; and the image correction device of claim 1.

* * * * *